United States Patent [19]

Salter et al.

[11] 3,841,309

[45] Oct. 15, 1974

[54] METHOD OF ANALYZING CEREBRAL ELECTRICAL ACTIVITY

[75] Inventors: Andrew Salter, New York, N.Y.; Robert Fried, East Brunswick, N.J.

[73] Assignee: Andrew Salter, New York, N.Y.

[22] Filed: Feb. 28, 1973

[21] Appl. No.: 336,539

Related U.S. Application Data

[63] Continuation of Ser. No. 99,817, Dec. 21, 1970, abandoned.

[52] U.S. Cl. ............................................. 128/2.1 B
[51] Int. Cl. .............................................. A61b 5/04
[58] Field of Search...... 128/2.05 P, 2.05 R, 2.05 T, 128/2.06 A, 2.06 R, 2.1 A, 2.1 B, 2.1 M, 2.1 R, 2.06 B, 2.06 F, 2.06 G

[56] References Cited
UNITED STATES PATENTS

| | | | |
|---|---|---|---|
| 3,174,478 | 3/1965 | Kahn | 128/2.06 F |
| 3,548,812 | 12/1971 | Paine | 128/2.1 B |
| 3,598,112 | 8/1971 | Figar | 128/2.1 R |
| 3,605,727 | 9/1971 | Zenevich et al. | 128/2.06 A |
| 3,650,263 | 3/1972 | Kowalski et al. | 128/2.06 G |
| 3,657,646 | 4/1972 | Zmyslowski et al. | 128/2.1 R |
| 3,662,746 | 5/1972 | Saltzberg et al. | 128/2.1 B |
| 3,675,640 | 7/1972 | Gatts | 128/2.05 R |
| 3,724,455 | 4/1973 | Unger | 128/2.06 A |

OTHER PUBLICATIONS

Hagan et al., "American Journal of Medical Electronics," April–June 1963, pp. 147-151.

*Primary Examiner*—William E. Kamm

[57] ABSTRACT

This application discloses a method of analyzing bioelectric outputs of living things by sensing, amplifying and comparing such outputs with selected predetermined values and providing indications of each occurrence of the departure of a discrete value of such outputs from such predetermined values.

14 Claims, 3 Drawing Figures

METHOD OF ANALYZING CEREBRAL ELECTRICAL ACTIVITY

This application is a continuation of application Ser. No. 99,817, filed Dec. 21, 1970, and now abandoned.

BACKGROUND OF THE INVENTION

This invention relates generally to methods and apparatus for analyzing bioelectrical phenomena. More specifically, it relates to methods and apparatus for sensing electrical signals produced by living tissue systems and means for producing representations of the values of such signals which may be used as analytical tools for research and diagnostic purposes. This invention relates generally to the way in which methods and apparatus for analyzing bioelectrical phenomena may be used to ascertain quantitative parameters of pathology.

The presence of electrical activity in living human and animal bodies has been known for a considerable period of time. Likewise, it has been known for some time that such activity can be sensed, recorded and its representation analyzed or studied. But it is recognized that the difficulties of interpreting the cortical biopotentials are not limited to methods of analysis of the trace, for it has been shown that current technology ignores substantial amounts of information. See, for instance, the patent to Fischer U.S. Pat. No. 3,195,533. The analysis of bioelectrical representations has developed particularly in the arts of electroencephalography and electromyography. In all of these arts, graphical representations of electrical signals derived from sensors responsive to the electrical activity of the brain or of muscles (including the heart), as the case may be, are produced and evaluated for diagnostic and research purposes.

Generally speaking, the electrical activity noted is said to be continuous. Yet it is well known that this continuous electrical activity, when examined closely by extremely small time sampling, has much discontinuity, and that the apparatus continuity is factitious and based on the mode of observation. Indeed, standard references state that that which is of diagnostic value in the EEG is actually the summation of all cortical activity into a continuous trace pattern.

Summation is the enemy of diagnostic precision, and it is a principal purpose of the instant invention to overcome the well-known shortcomings of the prior art which subsumes this summation model.

Indeed, the fact that the scientific literature dealing with techniques of analysis of cortical patterns is so voluminous may be related not only to the importance of the matter, but also to the dissatisfaction of practitioners with the current state of the art.

In the case of cardiac electrical activity, the essential characteristic of the signal is a repetitive increase in amplitude, or the generation of a pulse pattern each time there is a beat of the heart. Beyond that, it is the composite of many different components summing up in the trace. The visual representations of normal cardiac activity are well known and are designated generally as the P and T waves and the QRS complex. Without deprecating the skill of the cardiologist who understands and interprets electrocardiograms, the cardiac wave pattern is relatively simple when compared to a cerebral pattern. Consequently, the diagnostic significance of electrocardiac tracings is much better understood than that of electroencephalographic tracings, and the full implications of all cerebral electrical activity are not yet known and remain the subject of intensive investigation.

An electroencephalogram, when produced using conventional sensing and recording means, is, within limits, a stable pattern, exhibiting variations in frequency and amplitude. The electrical potential of the actual signal is very low, on the order of 20 to 100 microvolts, and the electrical frequencies which are of clinical importance, according to most authorities, are also rather low varying from 0.5 hertz to about 50 hertz. Yet, there is even evidence that these almost universally accepted beliefs may be false (See the patent to Fischer U.S. Pat. No. 3,195,533.) The low signal values and the considerable amplification required give rise to the problem of component and otherwise produced artifacts obscuring or altering the signal so that signal analysis is rendered even more difficult.

The state of the art is such that the most generally accepted significances in cerebral electrical activity are restricted to a limited number of particular patterns of graphic variation in amplitude and frequency. For example, in idiopathic petit mal epilepsy there is typically a characteristic and well-formed 3 hertz spike-and-wave complex. And during deep sleep, for example, there is characteristic delta (3.5 hertz or lower) or slow theta (4 to 7 hertz) activity. Further, inasmuch as different signals can be detected over different portions of the brain, such as, for example, over temporal, frontal, parietal and occipital areas, perceivable variations of these cerebral biopotential output signals can be useful in diagnosing the presence or absence of pathology of the brain.

The present system minimizes the elements as used in the present state of the art in order to increase signal information. This application discloses a system whereby the content of the derived signal is considerably increased by the use of apparatus for presenting digital or alpha numeric representations of variations in the frequency of cerebral electrical activity. It is herein contended that the nature of a cerebral biopotential, its presence (or absence) in varying quantity per unit time, constitute parameters of characteristic change in that cerebral output signals are different from those which the present state of the art teaches. For it is well known that to interpret conventional electroencephalograms for clinical purposes requires great skill, training, and experience. Although there is a great need for this service, EEG interpretation at present is usually not attempted by the average physician or surgeon. Indeed, as the patent to Fischer U.S. Pat. No. 3,195,533 states in column 3, lines 41–43, a normal clinical EEG examination usually requires as much as 200 to 400 feet of recording paper, and may take hours to interpret.

This apparatus includes a system by means of which data processing apparatus including a memory element is provided to store biopotential information obtained by the threshold method disclosed in this application for use as a diagnostic aid. It is contemplated that such data processing apparatus may be maintained at one or more central locations and that there be provided a communications link as, for instance, a telephone wire between each of a number of doctors' offices and the data processor. Located in the doctor's office there is an EEG apparatus, the output of which is supplied via communications link to the central data processor. Using well-known data translation and interpretation techniques the EEG outputs transmitted may be compared with those patterns maintained in the data processor memory. If clinically valid congruence is obtained, a print-out would be provided indicating a tentative or initial diagnosis or a statement as to whether or not the pattern being considered is "normal" or "abnormal" in some way.

The data stored in the data processor memory may be in either analog or digital form. Since at this time most data processors having significant memory capacity are of the digital type, it is contemplated that the EEG outputs would be converted to a digital form in the comparison procedures in the data processing apparatus.

The contents of the data processor memory can be an accumulation in digital form of statistically valid characteristic patterns and the data processor can easily be programmed to provide selected readouts when there is correspondence between EEG outputs transmitted from the physician's office and one of the patterns maintained in the data processor memory. Data translation and interpretation techniques besides involving pattern-matching against computer stored previously prepared data sets may also involve such computer operations on the input data into the computer such as the performance of arithmetic and algebraic operations, or adaptive "curve fitting" with reference to mathematical models, or the application of interactive mathematical procedures. An article by T. C. Gams, "Computer-Aided Medical Instrumentation; A Practical Reality" appearing in Transactions of the New York Academy of Sciences, Series II, Vol. 32, No. 3, March 1970, pp. 348–363, describes generally some of the apparatus and techniques which may be used while others are described elsewhere in the literature.

Therefore, it is an object of this invention to provide a novel method to render the objects of invention commensurate with the invention for evaluating electrical activity in living human and animal bodies.

It is a further object of this invention to provide a novel method to render the objects of invention commensurate with the invention for evaluating electrical activity in living humans and animals which permits a more rapid analysis than visual indications of such electrical activity as now presented by various kinds of previously known indicating devices.

It is another object of this invention to provide a novel method to render the objects of invention commensurate with the invention for evaluating electrical activity in living humans and animals which provides indications of such electrical activity that are representations of significant variations so as to permit a more profound analysis or investigation than possible in the present state of the art.

It is still another object of this invention to provide a method to render the objects of invention commensuarate with the invention for detecting electrical activity in living humans and animals which permits an analysis to be made by individuals who do not have the necessary skill to make an analysis using present techniques and apparatus.

SUMMARY OF THE INVENTION

The foregoing and other objects are achieved in a system which recognizes variations in both the amplitude and frequency at different levels of amplitude threshold of such electrical activity, thus providing representations of such signals which may be easily converted from analog to digital form. The invention further contemplates that the converted signals may be used in conjunction with the memory and comparison capability of a data processor to provide readouts as diagnostic and evaluation aids.

BRIEF DESCRIPTION OF THE DRAWINGS

The invention itself is set forth in the claims appended hereto and forming a part of this application while the structure and mode of operation of embodiments thereof may be understood by reference to the detailed description taken in conjunction with the drawings in which:

DETAILED DESCRIPTION

Figure 1:
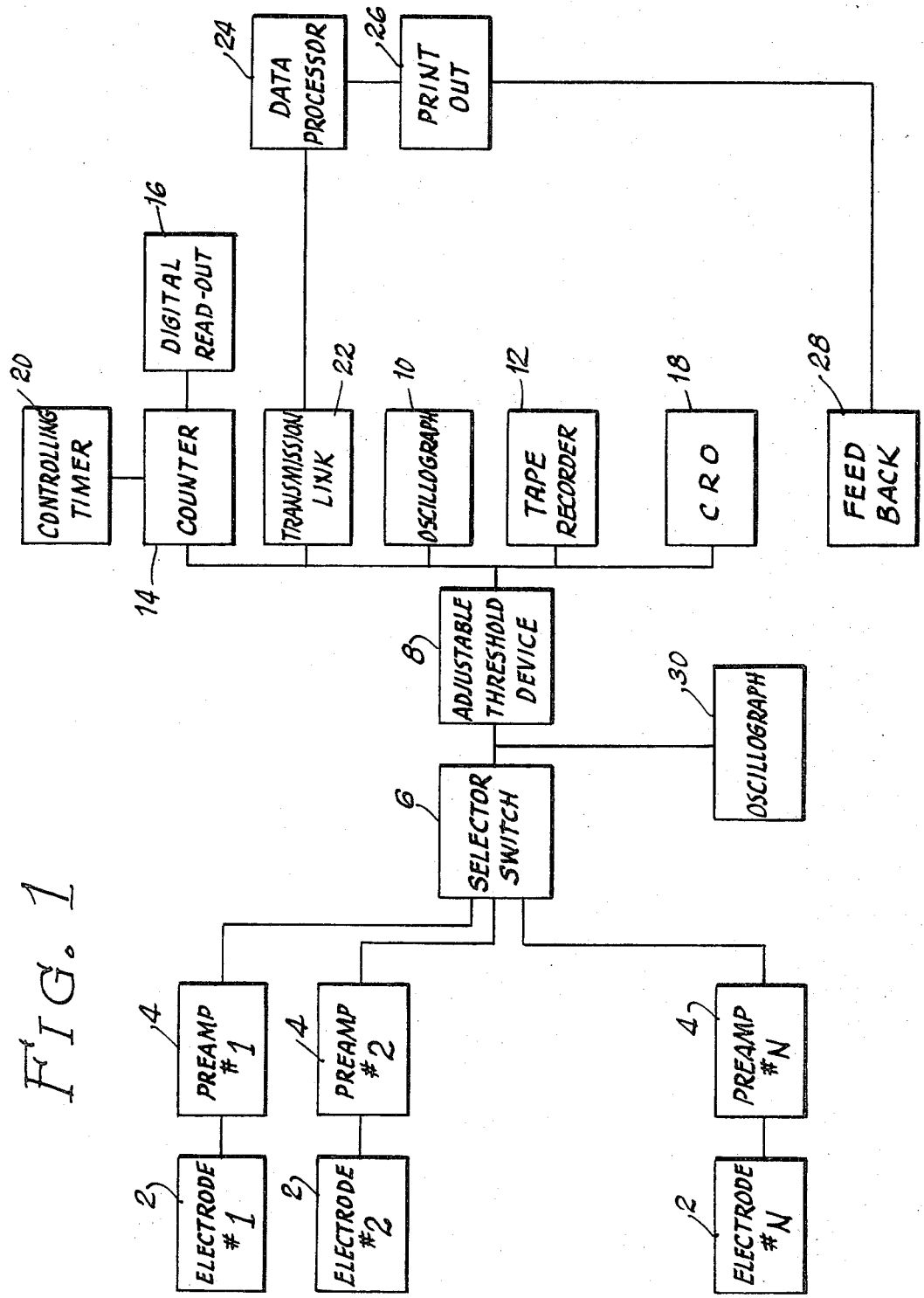
FIG. 1 is a block diagram of an embodiment of the invention.

Referring to FIG. 1, a plurality of electrodes 2 is provided which may in one usage be applied to the scalp of a subject so as to respond to cortical biopotential amplitude and frequency changes. It should be understood that the electrodes may be applied equally well to other parts of the subject's body in order to sense electrical activity from such other parts. The output of each electrode is supplied as an input to an associated pre-amplifier 4, the output of which is connected to a selector switch 6. The operator, by manipulating the selector switch, may determine which electrode pair he desires to use at a particular time.

When used to measure the biopotential of the subject's brain, the electrodes may be positioned about the head so as to respond to the electrical activity from the various portions of the brain such as, for example, its temporal, frontal, parietal, and occipital portions.

The operator having determined the particular biopotential he wants to evaluate operates the selector switch 6 so as to provide the output of the desired electrode pair as an input to an adjustable threshold device 8. This device may be any one of the alinear amplifiers well known in the art wherein a lower limit may be set so as to permit it to emit a pulse only when those electrical signals in excess of a predetermined value occur. The output of the threshold device may be supplied to an oscillograph 10 so as to present an immediate visual representation of the supra-threshold signals. At the same time the output of the amplifier 8 may be recorded on a tape recorder 12 for convenient storage and future use. Likewise, the signals may be supplied to pulse counter 14 producing a digital representation of the supra-threshold analog signals presented on a digital readout device 16.

In the use of this apparatus an amplitude threshold value is set at a previously determined level. The number of times which the electrical signals, produced by the body between the selected electrode pair, differs from this threshold level may then be used as an investigative tool. Thus, the resulting signal will be essentially a frequency count that will indicate how many times in a short time interval the biopotential amplitude exceeded a threshold value.

In an alternative embodiment, the threshold device 8 may be constituted by more than one device, each arranged to provide an output when its own particular threshold level is exceeded. When so constituted, the output will then consist of parallel channels, each carrying signals representing each time an event produced an electrical signal in excess of one or more of the selected thresholds. In this manner, an analysis can be made of the number of times a bioelectric output was above or below a given threshold by predetermined amounts — each of these predetermined amounts being themselves threshold levels.

Figure 2:
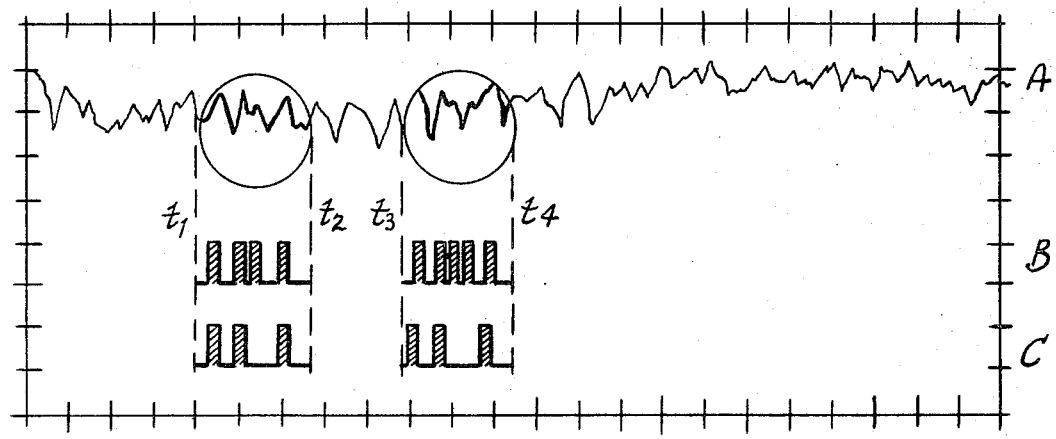
FIG. 2 is a reproduction of actual results produced by means of the prior art and as taught by this invention in one test wherein voltage is plotted against time.

The resulting pattern is therefore one which is easier to "read," for it extracts discrete events from an otherwise seemingly random and confusing sequence. This can be appreciated by reference to FIGS. 2 and 3. In FIG. 2, trace A is the reproduction of a typical output of an electroencephalographic channel. As may be seen, the pattern reproduced is a seemingly random pattern showing variations in frequency and amplitude. Visual examination of that portion of the pattern in the time interval from $t_1$ to $t_2$ shows both negative and positive signals and it would seem that the only significant variations are the three positive peaks represented by the three pulses in the trigger pulse trace C of this figure. However, by deciding that all signals which exceeded a predetermined threshold level are significant, it may be seen by reference to trigger pulse trace B of the said FIG. 2 that within the time interval $t_1$ to $t_2$ the potential rose above this threshold four times so that the amount of information presented for analysis and evaluation has been increased by 33⅓%.

Likewise, also in FIG. 2, in the time interval $t_3$ to $t_4$ in traces A and C, it may appear, on visual inspection, that there are only three events of significance. However, trace B of this said FIG. 2 reveals five events when the amplitude exceeded the predetermined threshold value, thus resulting in a finer resolution of the information contained within the pattern, in fact giving an information increase of 66⅔%. At the same time the information presented has the quality of being distinct, that is, the pulses of trace B stand out much better than do the seemingly random variations in trace A.

Figure 3:
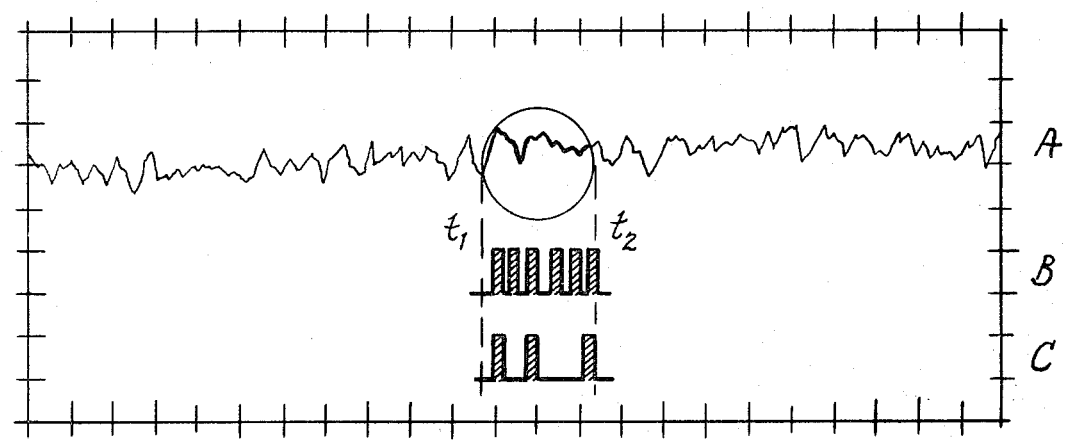
FIG. 3 is another reproduction of actual results produced by means of the prior art and as taught by this invention in another test with voltage plotted against time.

Another instance of how a system in accordance with the invention yields significant information may be seen by reference to FIG. 3. In this figure in the time interval from $t_1$ to $t_2$ when traces A and C are considered together, it would seem that only three significant events occurred, but when the output of an adjustable threshold amplifier is used trace B reveals that in the time interval under study the threshold value was exceeded six times. Here the invention yields an information increase of 100 percent.

It is clear that this invention provides means for extracting greater amounts of information from the biopotentials produced by various portions of the bodies of living humans and animals than does the prior art techniques. At the same time the information is presented in a way which can be read more easily than the traces produced by the techniques of the prior art. Further, all readers of the biopotential data will extract exactly the same information. Consequently, investigation into the significance of biopotentials, particularly those cerebral in nature, is greatly facilitated. By deriving representations of the type shown in trace B of FIGS. 2 and 3 at the same time stimuli are applied to a subject, or when a state such as sleep or awakening is present, or when a cerebral disorder or dysfunction is known to exist, characteristic patterns may then be used for diagnostic and investigative purposes.

The method described in this application involves recognition that there is significant information contained in the extent to which a bioelectric output as represented by a detected pulse or amplitude change departs from a predetermined value and in the frequency of such departures. Consequently, the specific devices used to sense, amplify and compare bioelectric outputs with the predetermined values can be varied using any combination of known devices suitable for these purposes. For instance, the adjustable threshold device as noted may be an alinear amplifier, such as an adjustable threshold amplifier. The output of such an amplifier, singly in combination with a pulse generator, may produce a pulse of regular amplitude and width so as to constitute a convenient input to a device such as the counter 14.

If desired, conventional electroencephalographic apparatus may be used to sense, amplify and select the signals to be supplied to the adjustable threshold device. Further, this device may be arranged to provide parallel output channels so as to transmit the bioelectric outputs from more than one sensor pair simultaneously.

It is contemplated that various analytical procedures may be used in the practice of the invention. By the use of the threshold device the study of discrete amplitude changes is considerably facilitated and it is believed that the information yield will be considerably increased.

At the same time spectral or frequency analytical methods may be used. Thus, the method disclosed herein may be used in conjunction with broad or narrow band filters and frequency analyzers. In this case, as with the case of amplitude analysis, the ability to provide an indication of a discrete event will facilitate analysis. The signals for use in such analysis may be derived from time counter 14 which when permitted to count for predetermined amounts of time by a timer 20 will provide information which has both an amplitude and frequency characteristic.

The utilization of the derived information may also take a variety of forms. Thus, as indicated above, an immediate visual indication may be provided by the use of an oscillograph 10. Another device for providing such an immediate visualization may be a cathode ray oscilloscope 18. At the same time or alternatively, the electrical signals representing the discrete events detected by the adjustable threshold device 8 may be recorded on the tape recorder 12 for playback at a future point or for transmission to a diagnostic facility at a remote location. The transmission to remote locations may be done by using existing means such as telephone links and may be multiplexed in accordance with known techniques.

Insofar as the counter and digital readout are concerned, it may be desired to provide a digital readout of discrete events occurring within predetermined time intervals. For this purpose a timer 20 may be provided to permit the counter 14 to count for adjustable periods of time.

The invention further contemplates that the sensed data may be compared with data stored in the memory of a data processor which may be at a remote location. For this purpose the output of the adjustable threshold device is supplied to a transmission link 22 which may be constituted by suitable analog to digital converting and multiplexing apparatus. The transmission link 22 supplies an input to a data processor 24. The output of the data processor appears at a print-out 26 and is fed back by suitable transmission means to the point of data origin as shown at 28.

The incoming information entering the data processor undergoes data translation and interpretation. The list of fundamental data translation and interpretation techniques is short:

By performing arithmetic and algebraic operations on data

By adaptive "curve fitting" with reference to mathematical models

By applying interactive mathematical procedures

By searching for identity or congruence in previously prepared data sets, "i.e., pattern-matching."

In the latter technique, that is, pattern-matching, the analysis consists of ascertaining the degree to which the incoming information corresponds to known patterns which have been previously stored in the computer main memory. Using known programming techniques, a particular input pattern is shifted through the input-/output controller to the arithmetic unit and its digital representation compared with the digital representation of the known pattern stored in the main memory. When there is correspondence in congruence, within some specified tolerance, between the input pattern and a stored pattern the printout may be activated to provide an indication. The degree of correspondence may be used to provide different indications. Thus, if there is 100 percent correspondence with a particular stored pattern, this may be indicated. A degree of correspondence less than 100 percent may provide indications that the existence of a condition is probable or possible.

The decision of the computer may be in the form of code numbers, each code number indicating both the level of statistical validity of the pattern, and the nature (in the case of the EEG) of the EEG diagnosis. The code number, as produced by the data processor, may then be returned to the practitioner through any one of a variety of different means such as telephone (voice or teletypewriter), mail, etc.

In order that comparisons with conventional techniques of bioelectric output analysis may be had, if desired, the outputs of the selector switch 6 may be supplied to an oscillograph 30 capable of producing wave patterns of the type illustrated in trace A of FIGS. 2 and 3.

Obviously, the various components of a system in accordance with the invention may take various forms, for numerous devices are known having the functional capabilities desired. In addition, the arrangement of all the elements shown is not critical, for variations may be had while still remaining within the scope and essence of the invention, as set forth in the claims.

What is claimed as new and desired to be secured by Letters Patent of the United States is:

1. The method of analyzing cerebral electrical activity comprising the steps of:

sensing the cerebral electrical outputs from selected locations on the head of a living subject;

comparing such outputs with more than one adjustable predetermined value;

producing signals representing each time any one of said outputs has a value which exceeds any one or more of said adjustable predetermined values; and determining the number of the signals so produced at each of said adjustable predetermined values.

2. The method of claim 1 wherein said last-mentioned step comprises the step of providing a visual indication of said signals.

3. The method of claim 1 wherein said last-mentioned step comprises the step of recording said signals.

4. The method of claim 1 wherein said last-mentioned step comprises the step of counting the number or said signals occurring in discrete time intervals.

5. The method of claim 1 including the step of comparing said signals with statistically valid groups of similar signals in a memory data storage means to ascertain the degree of correspondence of said signals with any one or more of said groups of signals in the data storage means.

6. The method of claim 5 wherein said step of comparing said signals with said groups of signals in the data storage means includes the step of transmitting said signals to a remote location for such comparison.

7. The method of claim 6 including the step of transmitting to the point of origin information derived from the step of comparing the signals with the signals in the data storage means.

8. The method of claim 1 wherein the signals derived are those representing each time a discrete one of said outputs is at least equal to said predetermined value.

9. The method of claim 8 wherein said last-mentioned step comprises the step of providing a visual indication of said signals.

10. The method of claim 9 wherein said last-mentioned step comprises the step of recording said signals.

11. The method of claim 8 wherein said last-mentioned step comprises the step of counting the number of said signals occurring in discrete time intervals.

12. The method of claim 8 including the step of comparing said signals with statistically valid groups of similar signals in a data storage means to ascertain the degree of correspondence of said signals with any one or more of said groups of signals in the data storage means.

13. The method of claim 12 wherein said step of comparing said signals with said groups of signals in the data storage means including the step of transmitting said signals to a remote location.

14. The method of claim 13 including the step of transmitting to the point of origin information derived from the step of comparing the signals with the signals in the data storage means.

* * * * *